United States Patent [19]

Castner et al.

[11] Patent Number: 4,912,182

[45] Date of Patent: Mar. 27, 1990

[54] SYNTHESIS OF HIGH VINYL POLYBUTADIENE UTILIZING A MOLYBDENUM CATALYST SYSTEM

[75] Inventors: Kenneth F. Castner, Uniontown; Anthony J. Bell, Stow; Kimberly M. Glenn, Broadview Heights, all of Ohio

[73] Assignee: The Goodyear Tire & Rubber Company, Akron, Ohio

[21] Appl. No.: 238,374

[22] Filed: Aug. 31, 1988

[51] Int. Cl.$^4$ .......................... C08F 4/78; C08F 36/06
[52] U.S. Cl. .................................... 526/142; 502/117; 526/162; 526/169; 526/335
[58] Field of Search ................. 526/142, 162, 169

[56] References Cited

U.S. PATENT DOCUMENTS 3,451,987  6/1969  Dawans et al. ............... 260/94.3
3,663,480  5/1972  Zelinski et al. ................ 526/169
3,772,263  11/1973  Dawans et al. ............... 260/94.3

FOREIGN PATENT DOCUMENTS 1278516  6/1972  United Kingdom ............. 526/162

*Primary Examiner*—Edward J. Smith
*Attorney, Agent, or Firm*—Alvin T. Rockhill

[57] ABSTRACT

High vinyl polybutadiene rubber is utilized in a variety of applications. For instance, high vinyl polybutadiene is utilized in tire tread rubber compositions because it provides both good traction and rolling resistance. The present invention discloses a technique for synthesizing high vinyl polybutadiene utilizing a molybdenum catalyst system. This molybdenum catalyst system can be utilized in aliphatic solvents with high yields of about 75% being attained. The molybdenum catalyst systems of this invention are comprised of (a) a molybdenum containing compound which is prepared by modifying molybdenum pentachloride, molybdenum trichloride, or molybdenum tetrachloride with an alkyl carboxylic acid or an aryl carboxylic; and (b) an aluminum containing compound which is prepared by modifying a trialkyl aluminum compound with a phenol. The molecular weight of the high vinyl polybutadiene being prepared can be reduced by modifying the trialkyl aluminum compound with an allylphenol, such as 2-allylphenol.

14 Claims, No Drawings

SYNTHESIS OF HIGH VINYL POLYBUTADIENE UTILIZING A MOLYBDENUM CATALYST SYSTEM

BACKGROUND OF THE INVENTION

High vinyl polybutadiene is a rubber which is utilized in a variety of applications. For example, high vinyl polybutadiene is sometimes used in preparing tire tread rubbers. This is because its utilization in tire treads provides good traction and rolling resistance. The high vinyl polybutadiene utilized in such applications typically contains at least about 60% repeat units which have the 1,2-microstructure.

High vinyl polybutadiene is commonly prepared utilizing lithium catalyst systems which are modified with a polar modifier. The polar modifier increases the vinyl content of the polybutadiene being synthesized. Ethers and tertiary amines which act as Lewis bases are commonly utilized as polar modifiers in conjunction with lithium catalyst systems. For example, U.S. Pat. No. 4,022,959 indicates that diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, and N-phenyl morpholine can be used as modifiers. The vinyl group content of polydienes prepared utilizing such Lewis bases as modifiers depends upon the type and amount of Lewis base employed as well as the polymerization temperature utilized. For example, if a higher polymerization temperature is employed, a polymer with a lower vinyl group content is obtained (see A. W. Langer, A. Chem. Soc. Div. Polymer Chem. Reprints: Vol. 7 (1), 132 [1966]). For this reason, it is difficult to synthesize polymers having high vinyl contents at high polymerization temperatures utilizing typical Lewis base modifiers.

Higher temperatures generally promote a faster rate of polymerization. Accordingly, it is desirable to utilize moderately high temperatures in commercial polymerizations in order to maximize throughputs. U.S. Pat. No. 4,696,986 discloses that 1,2,3-trialkoxybenzenes and 1,2,4-trialkoxybenzenes can be utilized as modifiers for lithium catalyst systems to promote the formation of high vinyl polymers at temperatures which are high enough to promote fast polymerization rates.

Molybdenum catalyst systems have been utilized in the preparation of high vinyl polybutadiene. However, it has traditionally been necessary to utilize aromatic solvent systems in conjunction with such catalyst systems in order to attain acceptable conversions. The undesirable nature of utilizing such aromatic solvent systems has essentially precluded the utilization of molybdenum catalyst systems in commercial operations. Conventional molybdenum catalyst systems also lead to the production of high vinyl polybutadiene having extremely high molecular weights. For example, the utilization of such molybdenum catalyst systems typically leads to the production of high vinyl polybutadiene having a number average molecular weight of about 500,000. In most applications it is undesirable for the high vinyl polybutadiene to have a molecular weight which is that high. Accordingly, the high molecular weight of the polymer produced has also hindered the commercial development of molybdenum catalyst systems for preparing high vinyl polybutadiene.

SUMMARY OF THE INVENTION

The molybdenum catalyst systems of this invention can be utilized to prepare high vinyl polybutadiene in aliphatic solvent systems with high yields of about 75% being attained. Additionally, high vinyl polybutadiene having a molecular weight of about 250,000 can be prepared. The utilization of the catalyst systems of this invention also leads to the formation of high vinyl polybutadiene which has a very high degree of consistency.

The subject invention more specifically discloses a process for preparing high vinyl polybutadiene which comprises polymerizing 1,3-butadiene monomer in the presence of a catalyst system which is comprised of (a) at least one molybdenum containing compound which is prepared by modifying at least one member selected from the group consisting of molybdenum pentachloride, molybdenum trichloride and molybdenum tetrachloride with at least one member selected from the group consisting of alkyl carboxylic acids containing from about 10 to about 30 carbon atoms and aryl carboxylic acids containing from 7 to 30 carbon atoms; and (b) at least one aluminum containing compound which is prepared by modifying a trialkyl aluminum compound having alkyl groups which contain from 1 to about 8 carbon atoms with at least one member selected from the group consisting of alkylphenols, allylphenols, and arylphenols.

This invention also reveals a process for preparing high vinyl polybutadiene which comprises polymerizing 1,3-butadiene monomer in the presence of a catalyst system which is comprised of (a) tetrachloromolybdenum carboxylate and (b) at least one aluminum compound selected from the group consisting of diethyl aluminum phenoxide and ethyl aluminum bisphenoxide.

It has also been discovered that the molecular weight of the high vinyl polybutadiene being produced can be reduced by modifying the trialkyl aluminum compound being utilized with an allylphenol. For instance, it has been determined that by modifying triethyl aluminum utilized in the catalyst system with 1.25 moles of 2-allylphenol that the number average molecular weight of the polymer produced is reduced to about 250,000. A molecular weight of about 250,000 is highly desirable for utilization in most applications. Accordingly, it is highly preferred to modify the trialkyl aluminum compound utilized in the catalyst system with an allylphenol.

DETAILED DESCRIPTION OF THE INVENTION

By utilizing the molybdenum catalyst systems of this invention, high vinyl polybutadiene can be prepared in aliphatic solvent systems to high yields. The high vinyl polybutadiene prepared will contain at least about 65% repeat units which have the 1,2-microstructure. In most cases, the high vinyl polybutadiene produced will have a vinyl content in excess of about 70%. In fact, it is possible to utilize the molybdenum catalyst systems of this invention to prepare high vinyl polybutadiene having vinyl contents in excess of 75%. The molybdenum catalyst systems of this invention have in fact been used in the preparation of high vinyl polybutadiene which had a vinyl content in excess of about 80%.

The polymerizations of the present invention are normally carried out utilizing a paraffinic or cycloparaffinic compound as the solvent. In other words, the molybdenum catalyst systems of this invention are utilized in solution polymerizations wherein the solvent is an aliphatic compound. The aliphatic solvent utilized will normally contain from about 4 to about 10 carbon atoms per molecule and will be a liquid under the conditions of the polymerization. Some representative examples of suitable organic solvents include pentane, normal hexane, cyclohexane, normal heptane, isoheptane, normal octane, isooctane, and the like, alone or in admixture.

In the solution polymerizations of this invention, there will normally be from about 5 to about 35 weight percent 1,3-butadiene monomer present in the polymerization medium. Such polymerization mediums are, of course, comprised of an aliphatic organic solvent, the 1,3-butadiene monomer, and the molybdenum catalyst system of this invention. In most cases, it will be preferred for the polymerization medium to contain from about 10 to about 30 weight percent 1,3-butadiene monomer. It is typically more preferred for the polymerization medium to contain from about 15 to about 25 weight percent 1,3-butadiene monomer.

The catalyst systems of this invention are comprised of (a) at least one molybdenum containing compound and (b) at least one aluminum containing compound. The molybdenum containing compound is prepared by modifying molybdenum pentachloride, molybdenum trichloride or molybdenum tetrachloride with an alkyl carboxylic acid containing from about 10 to about 30 carbon atoms or an aryl carboxylic acid containing from 7 to 30 carbon atoms. The utilization of molybdenum pentachloride or molybdenum trichloride is generally preferred with it normally being most preferred to modify molybdenum pentachloride. It is normally preferred to modify the molybdenum compound with an alkyl carboxylic acid. However, aryl carboxylic acids such as benzoic acid can be used. It is normally preferred for the alkyl carboxylic acid to contain from about 12 to about 26 carbon atoms with it being more preferred for the alkyl carboxylic acid to contain from about 14 to about 20 carbon atoms. For example, stearic acid and palmitic acid are highly preferred alkyl carboxylic acids for utilization in modifying the molybdenum compound. It is, of course, also possible to utilize mixtures of various alkyl carboxylic acids in the modification procedure.

The molar ratio of the alkyl carboxylic acid or aryl carboxylic acid to the hydrogenated molybdenum compound will normally be about 1 1. This is because at molar ratios of greater than 1:1 there is a loss in catalytic activity. On the other hand, at molar ratios of less than 1:1 there is a loss in solubility of the modified molybdenum containing compound in aliphatic solvents. For this reason, a molar ratio of the alkyl carboxylic acid or aryl carboxylic acid to the halogenated molybdenum compound will typically be within the range of about 0.8:1 to about 1.2:1.

The halogenated molybdenum containing compound is typically modified by simply adding the alkyl carboxylic acid or aryl carboxylic acid thereto. This results in the formation of the modified molybdenum containing compound which is utilized in the catalyst systems of this invention. The carboxyl group containing compound reacts with the halogenated molybdenum containing compound giving off hydrochloric acid as a reaction by-product. It is believed that various molybdenum carboxylates are formed through this reaction.

For example, it is believed that by modifying molybdenum pentachloride that tetrachloromolybdenum carboxylates are formed. More specifically, the modification of molybdenum pentachloride with stearic acid is believed to result in the formation of tetrachloromolybdenum stearate However, the reaction stoichiometry would seem to indicate that the following bridged compound may be formed because about 1.5 moles of hydrochloric acid is generated per mole of the halogenated molybdenum containing compound:

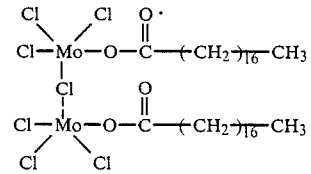

The aluminum containing compound component of the catalyst system can be preformed or can be made "in situ". The molar ratio of the phenol utilized in the modification of the trialkyl aluminum compound will typically be within the range of about 1.0:1 to about 1.5:1. The molar ratio of the phenol utilized in the modification to the trialkyl aluminum compound will preferably be within the range of about 1.15:1 to about 1.35:1. The molar ratio of the phenol to the trialkyl aluminum compound will most preferably be within the range of about 1.2:1 to about 1.3:1. Dialkyl aluminum phenoxides and ethyl aluminum bisphenoxides are believed to be formed in the modification procedure.

The molar ratio of the aluminum containing compound to the molybdenum containing compound in the catalyst systems of this invention will typically be within the range of about 1.5:1 to about 10:1. However, it will generally be preferred for the ratio of the aluminum containing compound to the molybdenum containing compound to be within the range of about 2:1 to about 8:1. To attain maximum catalytic activity, the molar ratio of the aluminum containing compound to the molybdenum containing compound will most preferably be within the range of about 5:1 to about 7:1.

The polymerization is initiated by simply adding the modified molybdenum containing compound and the modified aluminum containing compound to the polymerization medium. This can, of course, be done utilizing a batch procedure or in a continuous process. The amount of modified molybdenum containing compound utilized will typically be within the range of about 0.02 to 0.4 phm (parts per hundred parts of monomer). The amount of modified molybdenum containing compound utilized will preferably be within the range of about 0.06 phm to about 0.25 phm. It is more preferred to use from about 0.14 phm to about 0.18 phm of the modified molybdenum containing compound in the catalyst system utilized to initiate the polymerization.

The polymerizations of this invention are typically carried out at a temperature which is within the range of about 20° C. to about 140° C. It is preferred for the polymerizations of this invention to be conducted at a temperature which is within the range of about 40° C. to about 100° C. and it is more preferred for the temperature utilized to be within the range of about 60° C. to about 80° C. The amount of polymerization time required will vary with the reaction conditions utilized. However, a polymerization time which is within the range of about 30 minutes to about 12 hours will normally be employed. In most cases a polymerization time of about 1 hour to about 3 hours will be utilized.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1

In this experiment high vinyl polybutadiene was prepared by solution polymerization in hexane. The molybdenum containing compound component of the catalyst system was prepared by adding 243.1 grams of molybdenum pentachloride powder to a round bottom flask which was fitted with a mechanical stirrer, nitrogen inlet tube, and a vent tube which was connected to a caustic scrubber for neutralizing hydrochloric acid which was produced as a reaction by-product. This modification was conducted under a nitrogen atmosphere. A mixture containing 46.7% stearic acid and 53.3% palmitic acid was utilized in modifying the molybdenum pentachloride. This mixture of stearic acid and palmitic acid was added to the molybdenum pentachloride in the flask at a molar ratio of 1.06:1. The reactants in the flask were stirred at 250 rpm and after about 5 minutes, the mixture started to liquefy. Stirring was continued while purging with nitrogen to remove hydrochloric acid which was formed. After about 90 minutes, the contents of the flask were totally liquefied and 500 ml of hexane was added. Stirring was continued for an additional 90 minutes This modification procedure resulted in the formation of about 890 ml of a 1.0 molar solution.

The aluminum containing compound component of the catalyst system was prepared by modifying triethylaluminum. This was done by adding 140 ml of a 0.85 molar solution of triethylaluminum in hexane to 500 ml of dry hexane followed by the addition of 20.4 grams of 4-isopropylphenol which was dissolved in 29.3 ml of dry ethyl acetate. The bottle to which the reactants were added was vented and purged with nitrogen. The modification reaction was exothermic and considerable gas was evolved. The volume of the solution formed was 670 ml and was a 0.179 molar solution of the 4-isopropylphenol modified triethylaluminum.

The polymerization was carried out in a 27 gallon (102.2 liter) reactor This was done by adding 120 lbs. (54.4 kg) of a 17% solution of 1,3-butadiene monomer in hexane to the reactor After attaining an initial temperature of 125° C., 670 ml of the 0.179 molar modified triethylaluminum solution was added and immediately thereafter 520 ml of the 0.038 molar modified molybdenum pentachloride solution was added. The reactants reached a maximum temperature during the polymerization of 165° F. (74° C.). After about 1.5 hours, a yield of about 77% was attained. The polymer produced was then transferred to a shortstop tank and mixed with additional hexane to facilitate mixing with a shortstop and antioxidant.

The polymer produced was determined to have a vinyl content of about 82%, a glass transition temperature of about −24° C., a Mooney viscosity of 68, and a dilute solution viscosity of 6.22 dl/g.

EXAMPLES 2–5

This series of experiments was conducted utilizing the same general procedure described in Example 1 except that the triethylaluminum was modified with various amounts of 2-allylphenol in place of 4-isopropyl phenol. The molar ratio of 2-allylphenol to triethylaluminum utilized in the modification is reported in Table I. Table I also reports the number average molecular weight of the high vinyl polybutadiene produced.

TABLE I

| Example | Ratio of 2-allylphenol: triethylaluminum | Number Average Molecular Weight |
| --- | --- | --- |
| 2 | 1.0 | 373,000 |
| 3 | 1.25 | 264,000 |
| 4 | 1.5 | 183,000 |
| 5 | 1.75 | 122,000 |

As can be seen by examining Table I, the number average molecular weight of the high vinyl polybutadiene produced is decreased with increasing ratios of 2-allylphenol to triethylaluminum. It is clear from this series of experiments that 2-allylphenol can be utilized to reduce the molecular weight of the high vinyl polybutadiene being synthesized. In fact, a polymer of the desired molecular weight can be prepared by manipulating the ratio of 2-allylphenol to the trialkylaluminum compound. This series of experiments demonstrates the unique ability of 2-allylphenol to moderate the molecular weight of the polymer produced when it is utilized in modifying the trialkylaluminum component of the catalyst system.

While certain representative embodiments and details have been shown for the purpose of illustrating the present invention, it will be apparent to those skilled in this art that various changes and modifications can be made therein without departing from the scope of the present invention.

What is claimed is:

1. A process preparing high vinyl polybutadiene which comprises polymerizing 1,3-butadiene monomer in the presence of a catalyst system which is comprised of (a) at least one molybdenum containing compound which is prepared by modifying at least one member selected from the group consisting of molybdenum pentachloride, molybdenum trichloride and molybdenum tetrachloride with at least one member selected from the group consisting of alkyl carboxylic acids containing from about 10 to about 30 carbon atoms and aryl carboxylic acids containing from 7 to 30 carbon atoms; and (b) at least one aluminum containing compound which is prepared by modifying a trialkyl aluminum compound having alkyl groups which contain from 1 to about 8 carbon atoms with 2-allylphenol.

2. A process as specified in claim 1 wherein from about 0.02 to about 0.4 phm of the molybdenum containing compound is present.

3. A process as specified in claim 2 wherein the molar ratio of the aluminum containing compound to the molybdenum containing compound is within the range of about 1.5:1 to about 10:1.

4. A process as specified in claim 3 wherein the member selected from the group consisting of alkyl carboxylic acids and aryl carboxylic acids is an alkyl carboxylic acid containing from about 12 to about 26 carbon atoms.

5. A process as specified in claim 4 wherein said process is carried out at a temperature which is within the range of about 20° C. to about 140° C.

6. A process as specified in claim 5 wherein the molar ratio of allylphenol utilized in modifying the trialkylaluminum compound to the trialkylaluminum compound is within the range of about 1.0:1 to about 1.5:1.

7. A process as specified in claim 6 wherein the molar ratio of alkyl carboxylic acid to the member selected from the group consisting of molybdenum pentachloride, molybdenum trichloride, and molybdenum tetrachloride is within the range of about 0.8:1 to about 1.2:1.

8. A process as specified in claim 7 wherein the member selected from the group consisting of molybdenum pentachloride, molybdenum trichloride, and molybdenum tetrachloride is molybdenum pentachloride.

9. A process as specified in claim 8 wherein the alkyl carboxylic acid contains from 14 to 20 carbon atoms.

10. A process as specified in claim 1 wherein the molybdenum containing compound is prepared by modifying molybdenum pentachloride with at least one alkyl carboxylic acid containing from about 14 to about 20 carbon atoms.

11. A process as specified in claim 10 wherein the process is carried out utilizing a paraffinic compound as the solvent.

12. A process as specified in claim 10 wherein the process is carried out in a polymerization medium which is comprised of an aliphatic organic solvent, the 1,3-butadiene monomer, and the catalyst system; wherein the polymerization medium contains from about 10 weight percent to about 30 weight percent 1,3-butadiene monomer; and wherein the process is carried out at a temperature which is within the range of about 40° C. to about 100° C.

13. A process as specified in claim 12 wherein the trialkyl aluminum compound is triethyl aluminum: wherein the molar ratio of the aluminum containing compound to the molybdenum containing compound is within the range of about 5:1 to about 7:1: and wherein from about 0.14 phm to about 0.18 phm of the modified molybdenum containing compound is present in the polymerization medium.

14. A process as specified in claim 4 wherein the molar ratio of 2-allylphenol utilized in modifying the trialkylaluminum compound to the trialkylaluminum compound is within the range of about 1.0:1 to about 1.5:1

* * * * *